(12) United States Patent
Farahati et al.

(10) Patent No.: US 9,657,824 B2
(45) Date of Patent: May 23, 2017

(54) METHOD OF FABRICATING A TORQUE CONVERTER WITH AN ETCHED CLUTCH SURFACE AND A TORQUE CONVERTER WITH AN ETCHED CLUTCH SURFACE

(71) Applicant: Schaeffler Technologies AG & Co. KG, Herzogenaurach (DE)

(72) Inventors: Rashid Farahati, Copley, OH (US); Jeffrey Krause, Doylestown, OH (US); Christine Malott, Ashland, OH (US); Prasanna Gurumurthy, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 33 days.

(21) Appl. No.: 14/672,965

(22) Filed: Mar. 30, 2015

(65) Prior Publication Data

US 2015/0276034 A1 Oct. 1, 2015

Related U.S. Application Data

(60) Provisional application No. 61/973,312, filed on Apr. 1, 2014.

(51) Int. Cl.
*F16D 37/00* (2006.01)
*F16H 45/02* (2006.01)
*F16H 41/28* (2006.01)

(52) U.S. Cl.
CPC ............. *F16H 45/02* (2013.01); *F16H 41/28* (2013.01); *F16H 2045/0278* (2013.01); *F16H 2045/0289* (2013.01); *F16H 2045/0294* (2013.01); *Y10T 29/49321* (2015.01)

(58) Field of Classification Search
CPC .. F16H 45/02; F16H 41/28; F16H 2045/0278; F16H 2045/0294; F16H 2045/0289
See application file for complete search history.

(56) References Cited

U.S. PATENT DOCUMENTS

| | | | |
|---|---|---|---|
| 5,480,007 A | 1/1996 | Hartford | |
| 6,296,445 B1 * | 10/2001 | Chasseguet | F16H 41/28 416/180 |
| 6,315,639 B1 | 11/2001 | Kipp | |

(Continued)

FOREIGN PATENT DOCUMENTS

WO 2013-060313 5/2013

*Primary Examiner* — David J Hlavka
(74) *Attorney, Agent, or Firm* — Chester Paul Maliszewski (57) ABSTRACT

A method of fabricating a torque converter, including: forming a turbine shell including a first annular portion with a first surface having a first roughness and forming a radially outermost portion of the turbine shell; fixing a first plurality of blades to the turbine shell; forming an impeller shell including a second annular portion with a second surface having a second roughness; fixing a second plurality of blades to the impeller shell; removing at least a portion the first or second surface without the use of particulate matter or a liquid; increasing the first or second roughness of the first or second surface from which the at least a portion is removed; applying an adhesive to the first or second surface from which the at least a portion is removed; and bonding, with the adhesive, friction material to the first or second surface.

8 Claims, 5 Drawing Sheets

(56) References Cited

U.S. PATENT DOCUMENTS

| | | | |
|---|---|---|---|
| 6,428,276 B1* | 8/2002 | Chasseguet | F16H 41/28 |
| | | | 416/180 |
| 2006/0124419 A1* | 6/2006 | Kinoshita | F16D 69/026 |
| | | | 192/3.29 |
| 2007/0137033 A1* | 6/2007 | Murata | F16H 45/02 |
| | | | 29/889.2 |
| 2009/0178398 A1 | 7/2009 | Karamavruc et al. | |
| 2013/0284554 A1 | 10/2013 | Ideshio et al. | |

* cited by examiner

METHOD OF FABRICATING A TORQUE CONVERTER WITH AN ETCHED CLUTCH SURFACE AND A TORQUE CONVERTER WITH AN ETCHED CLUTCH SURFACE

CROSS-REFERENCE TO RELATED APPLICATIONS

This application claims the benefit under 35 U.S.C. §119 (e) of U.S. Provisional Patent Application No. 61/973,312, filed Apr. 1, 2014, which application is incorporated herein by reference in its entirety.

TECHNICAL FIELD

The present disclosure relates to a method of roughening a surface of a clutch, to which friction material is bonded, for a torque converter and a torque converter including a clutch with a roughened surface to which friction material is bonded.

BACKGROUND

Figure 5:
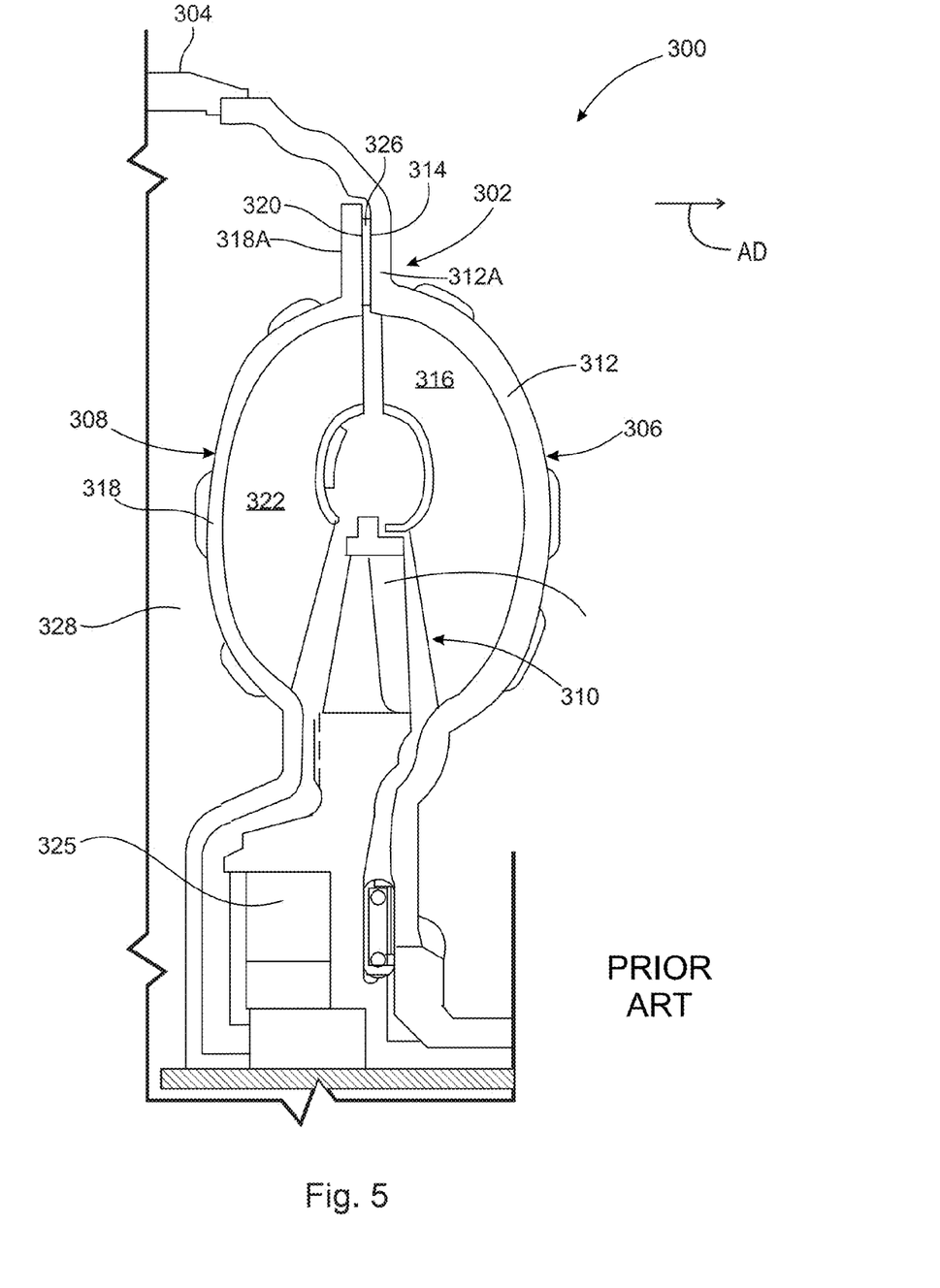

FIG. 5 is a partial cross-section of known torque converter 300 with turbine clutch 302. Torque converter 300 includes cover 304 arranged to receive torque, impeller 306, turbine 308, and stator 310. Impeller 306 includes impeller shell 312 with portion 312A having surface 314, and blades 316 fixedly connected to shell 312, for example by brazing. Turbine 308 includes turbine shell 318 with radially outermost portion 318A having surface 320, and blades 322 fixedly connected to shell 318, for example by brazing. Stator 310 includes blades 324 and one-way clutch 325. Clutch 302 includes friction material 326 bonded with adhesive to either surface 314 or 320. Clutch 302 acts as a lock-up clutch for converter 300. For example, pressure in chamber 328 forces shell 318 in axial direction AD to bring friction material 326 into contact with surfaces 314 and 320 to non-rotatably connect shells 312 and 318. Thus, torque transmitted to shell 312 is directly transmitted to shell 318.

In order to bond the friction material to surface 314 or 320, surface 314 or 320 are roughened to facilitate the bonding of the adhesive to surface 314 or 320. Typically, blades 316 and 322 are fixed to shells 312 and 318, respectively, by a brazing process which involves heating the blades and shells. The heating causes some distortion of surfaces 314 and 320. Surfaces 314 and 320 are then machined to remove the distortion. Because of the machining step, the roughening cannot be conducted until after the brazing process. That is, the machining would obliterate the roughening if the roughening is performed prior to the brazing operations.

It is known to use sandblasting, for example with aluminum oxide particles, to roughen surfaces such as surfaces 314 and 320. Following sandblasting, the sandblasted parts must be washed to remove particles remaining after the sandblasting process. However, the respective combinations of shell 312 and blades 316 and shell 318 with blades 322 creates a myriad of nooks, crannies, pockets, and other configurations in which particles can lodge. It is very difficult, it not virtually impossible, to remove the particles by washing or any other means. Particles remaining in the turbine or impeller can adversely affect operation of torque converter 300 or other equipment connected to the torque converter, for example, a transmission pump providing fluid to the torque converter.

SUMMARY

According to aspects illustrated herein, there is provided a method of fabricating a torque converter, including: forming a turbine shell including a first annular portion, the first annular portion including a first surface having a first roughness and forming a radially outermost portion of the turbine shell; fixedly connecting a first plurality of blades to the turbine shell; forming an impeller shell including a second annular portion with a second surface having a second roughness; fixedly connecting a second plurality of blades to the impeller shell; removing at least a portion the first or second surface without the use of particulate matter or a liquid; increasing the first or second roughness of the first or second surface from which the at least a portion is removed; applying an adhesive to the first or second surface from which the at least a portion is removed; and bonding, with the adhesive, friction material to the first or second surface from which the at least a portion is removed.

According to aspects illustrated herein, there is provided a method of fabricating a torque converter, including: forming a turbine shell including a first annular portion, the first annular portion including a first surface having a first roughness and forming a radially outermost portion of the turbine shell; fixedly connecting a first plurality of blades to the turbine shell; forming an impeller shell including a second annular portion having a second surface with a second roughness; fixedly connecting a second plurality of blades to the impeller shell; bombarding the first or second surface with particles of solidified carbon dioxide or with particles of $NaHCO_3$; applying an adhesive to the bombarded first or second surface; and bonding friction material to the bombarded first or second surface with the adhesive.

According to aspects illustrated herein, there is provided a torque converter, including: a cover arranged to receive torque; an impeller including an impeller shell fixedly connected to the cover and including a first surface; a first plurality of blades fixedly connected to the impeller shell; a turbine including a turbine shell with a second surface forming a radially outermost portion of the turbine shell; friction material bonded to the first or second surface with an adhesive; and a stator connected to the turbine and the impeller and including a third plurality of blades. The first or second surface to which the friction material is bonded includes a periodic pattern etched into the first or second surface to which the friction material is bonded.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
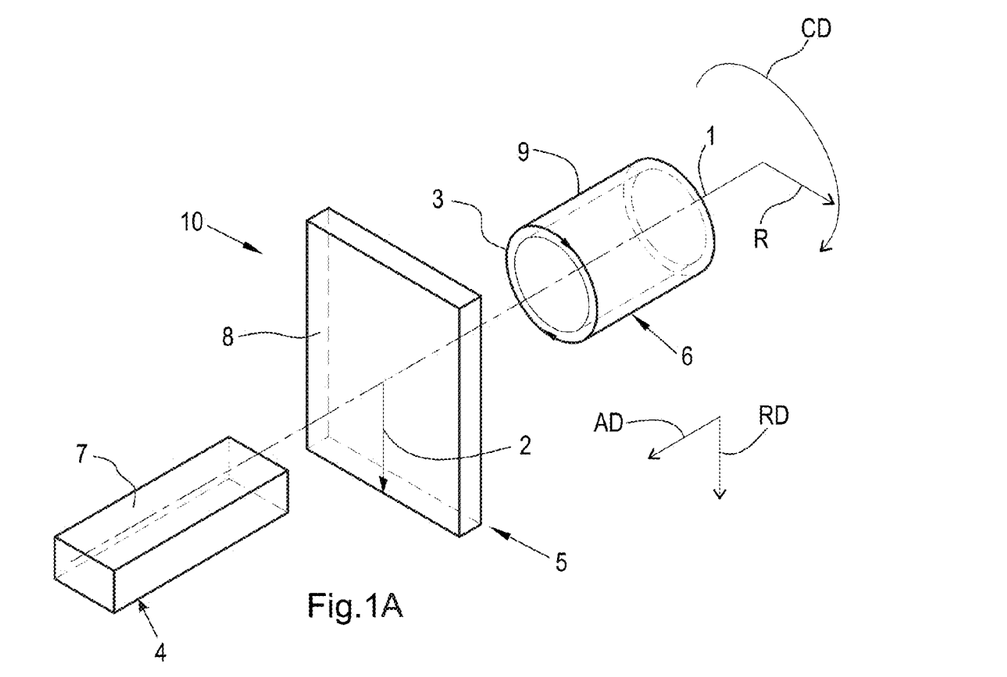
FIG. 1A is a perspective view of a cylindrical coordinate system demonstrating spatial terminology used in the present patent.

FIG. 1A is a perspective view of cylindrical coordinate system 10 demonstrating spatial terminology used in the present patent. The present invention is at least partially described within the context of cylindrical coordinate system 10. System 10 has a longitudinal axis 1, used as the reference for the directional and spatial terms that follow. Axial direction AD is parallel to axis 1. Radial direction RD is orthogonal to axis 1. Circumferential direction CD is defined by an endpoint of radius R (orthogonal to axis 1) rotated about axis 1.

To clarify the spatial terminology, objects 4, 5, and 6 are used. Surface 7 of object 4 forms an axial plane. For example, axis 1 is congruent with surface 7. Surface 8 of object 5 forms a radial plane. For example, radius 2 is congruent with surface 8. Surface 9 of object 6 forms a circumferential surface. For example, circumference 3 is congruent with surface 9. As a further example, axial movement or disposition is parallel to axis 1; radial movement or disposition is orthogonal to axis 2, and circumferential movement or disposition is parallel to circumference 3. Rotation is described herein with respect to axis 1.

The adverbs "axially," "radially," and "circumferentially" are used with respect to an orientation parallel to axis 1, radius 2, or circumference 3, respectively. The adverbs "axially," "radially," and "circumferentially" are also used regarding orientation parallel to respective planes.

Figure 1B:
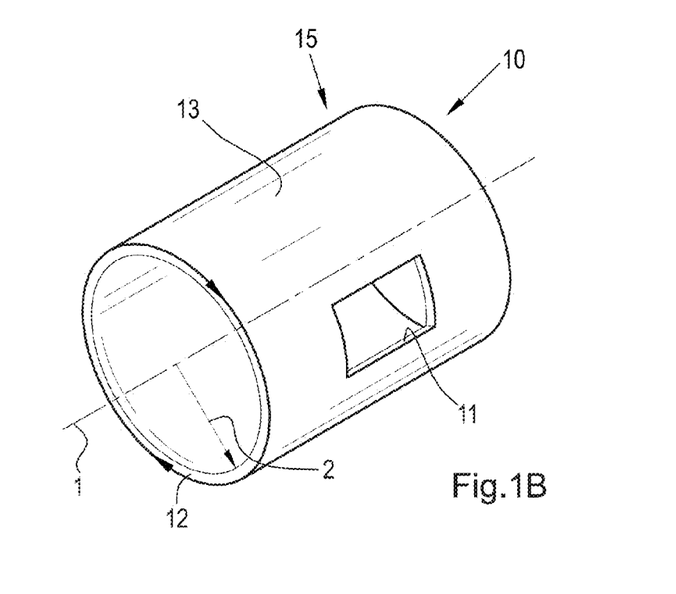
FIG. 1B is a perspective view of an object in the cylindrical coordinate system of FIG. 1A demonstrating spatial terminology used in the present patent.

FIG. 1B is a perspective view of object 15 in cylindrical coordinate system 10 of FIG. 1A demonstrating spatial terminology used in the present patent. Cylindrical object 15 is representative of a cylindrical object in a cylindrical coordinate system and is not intended to limit the claims of the present invention in any manner. Object 15 includes axial surface 11, radial surface 12, and circumferential surface 13. Surface 11 is part of an axial plane, surface 12 is part of a radial plane, and surface 13 is part of a circumferential surface.

Figure 2:
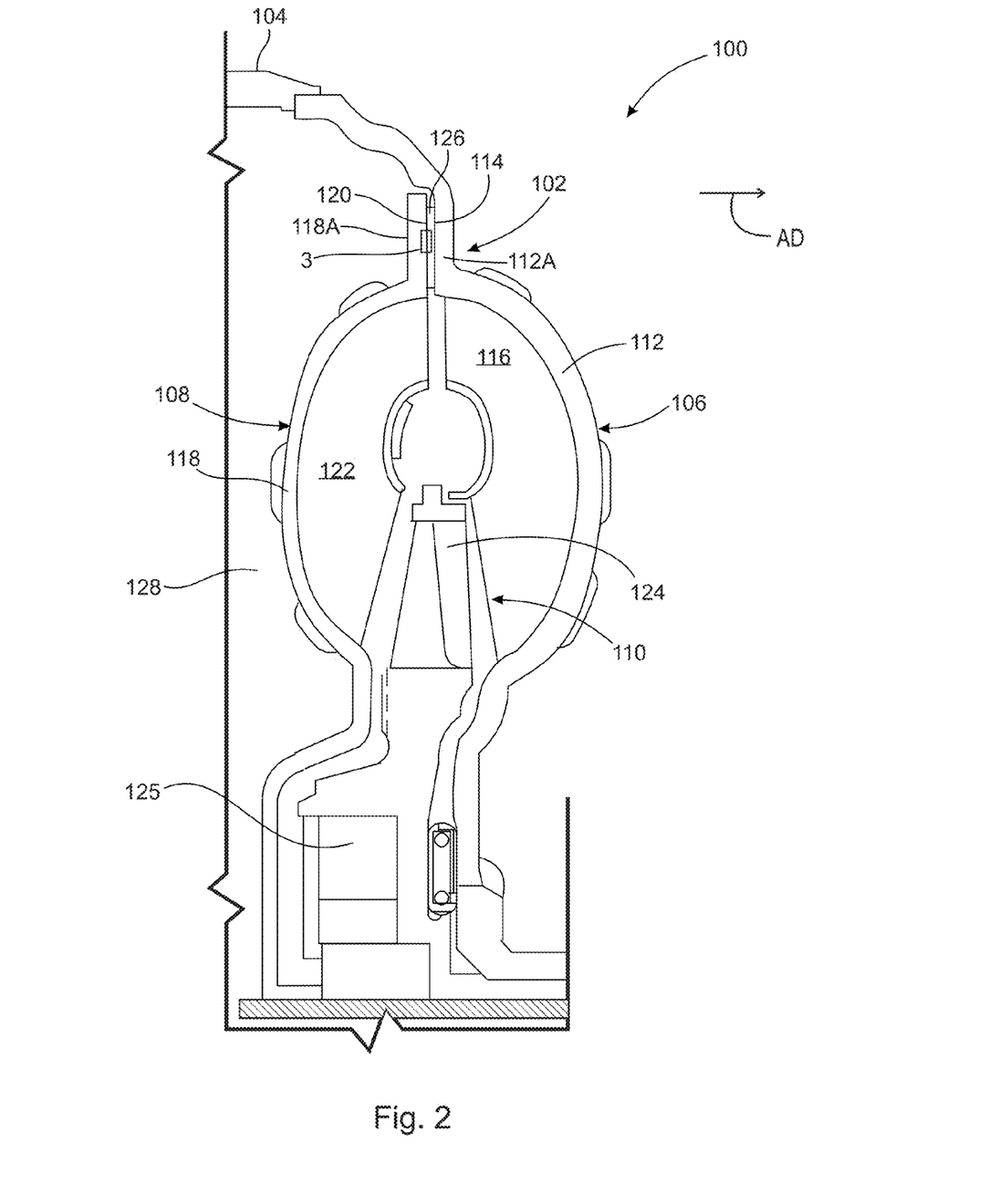
FIG. 2 is a partial cross-section of a torque converter including a turbine clutch with a roughened surface to which friction material is bonded.

FIG. 2 is a partial cross-section of torque converter 100 including turbine clutch 102 with a roughened surface to which friction material is bonded. Torque converter 100 includes cover 104 arranged to receive torque (for example from an engine [not shown]) impeller 106, turbine 108, and stator 110. Impeller 106 includes impeller shell 112 with annular portion 112A including surface 114, and blades 116 fixedly connected to shell 112. Turbine 108 includes turbine shell 118 with radially outermost portion 118A having surface 120, and blades 122 fixedly connected to shell 118. Stator 110 includes blades 124 and one-way clutch 125. Clutch 102 includes friction material 126 bonded with adhesive to either surface 114 or 120. Clutch 102 acts as a lock-up clutch for converter 100. For example, pressure in chamber 128 forces shell 118 in axial direction AD to bring friction material 126 into contact with surfaces 114 and 120 to non-rotatably connect shells 112 and 118. Thus, torque transmitted to shell 112 is directly transmitted to shell 118.

In order to bond the friction material to surface 114 or 120, surface 114 or 120 are roughened to facilitate the bonding of the adhesive to surface 114 or 120. Typically, blades 116 and 122 are fixed to shells 112 and 118, respectively, by a brazing process which involves heating the blades and shells. The heating causes some distortion of surfaces 114 and 120. Surfaces 114 and 120 are then machined to remove the distortion. Because of the machining step, the roughening cannot be conducted until after the brazing process. That is, the machining would obliterate the roughening if performed prior to the brazing operations.

Figure 3:
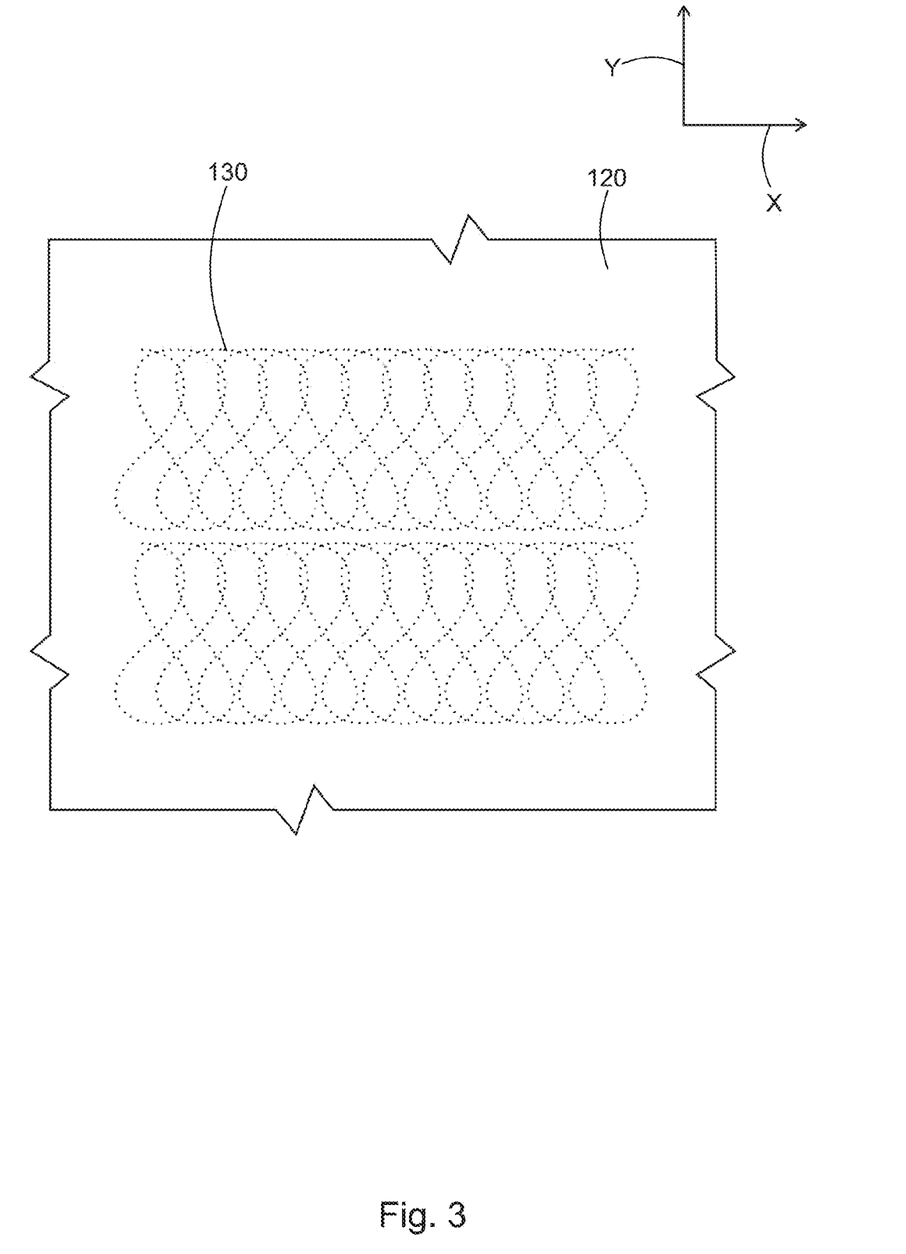
FIG. 3 is an axial view of a surface in area 3 of FIG. 2 showing a schematic representation of an example pattern etched in the surface.

FIG. 3 is an axial view of surface 120 in area 3 of FIG. 2 showing a schematic representation of example pattern 130 etched in surface 120. Although surface 120 is shown in FIG. 3, it should be understood that surface 114 also can include pattern 130 etched into surface 114. It should be understood that pattern 130 is a schematic example and that other patterns are possible. The patterning process is discussed below.

The following describes an example method for forming torque converter 100. Although the method is presented as a sequence of steps for clarity, no order should be inferred from the sequence unless explicitly stated. A first step forms impeller shell 112 including annular portion 112A. Portion 112A includes surface 114 having a first roughness. A second step fixedly connects blades 116 to the impeller shell. A third step forms turbine shell 118 and annular portion 118A. Portion 118A includes surface 120. Surface 120 has a second roughness. A fourth step fixedly connects blades 122 to turbine shell 118. A fifth step removes at least a portion of surface 114 or 120 without the use of particulate matter or a liquid. The description that follows is directed to surface 120; however, it should be understood that the description is applicable to surface 114 as well. A sixth step increases the roughness of surface 120. A seventh step applies an adhesive to surface 120. An eighth step bonds, with the adhesive, friction material 126 to surface 120.

Removing the at least a portion of surface 114 or 120 includes forming periodic pattern 130 in surface 120. In an example embodiment, fixedly connecting blades 116 to the impeller shell includes applying brazing material to the impeller shell and/or blades 116, and heating the impeller shell, brazing material, and blades 116. In an example embodiment, an ninth step, prior to the fifth step, machines surface 114 to attain the second roughness. In an example embodiment, fixedly connecting blades 122 to the turbine shell includes applying brazing material to the turbine shell and/or blades 122, and heating the turbine shell, brazing material, and blades 122. In an example embodiment, a tenth step, prior to the fifth step, machines surface 120 to attain the first roughness.

An eleventh step assembles the turbine and the impeller with stator 110. A twelfth step fixedly connects impeller shell 112 to cover 104.

In an example embodiment, a laser is used in the fifth step. The power of the laser and the duration with which the laser is focused on a particular area of surface 114 or 120 is determined so that the laser removes at least a portion of the respective material forming surface 114 and 120 to create pattern 130. In an example embodiment, the laser is moved in a figure-8 pattern in X and Y directions while being translated across surface 114 or 120 in the X or Y direction. Advantageously, the use of a laser to etch surface 114 or 120 does not result in particulate contamination of torque converter 100, for example, since the laser substantially evaporates the removed material and the evaporated material can be exhausted away from surface 114 or 120.

Figure 4:
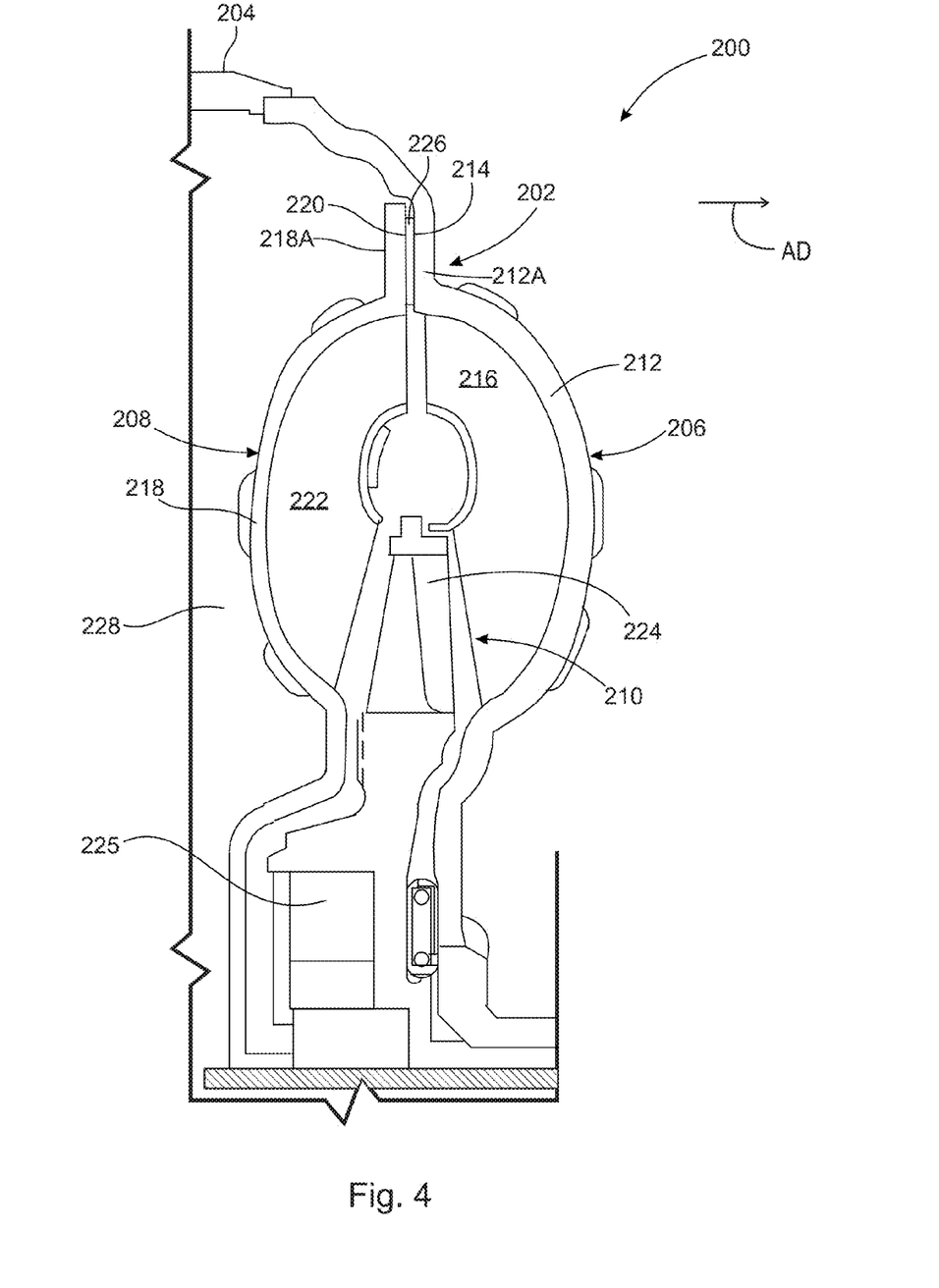
FIG. 4 is a partial cross-section of a torque converter including a turbine clutch with a roughened surface to which friction material is bonded; and, FIG. 5 is a partial cross-section of a known torque converter with a turbine clutch.

FIG. 4 is a partial cross-section of torque converter 200 including turbine clutch 202 with a roughened surface to which friction material is bonded. Torque converter 200 includes cover 204 arranged to receive torque (for example from an engine [not shown]), impeller 206, turbine 208, and stator 210. Impeller 206 includes impeller shell 212 with annular portion 212A including surface 214, and blades 216 fixedly connected to shell 212. Turbine 208 includes turbine shell 218 with radially outermost portion 218A with surface 220, and blades 222 fixedly connected to shell 218. Stator 210 includes blades 224 and one-way clutch 225. Clutch 202 includes friction material 226 bonded with adhesive to either surface 214 or 220. Clutch 202 acts as a lock-up clutch for converter 200. For example, pressure in chamber 228 forces shell 218 in axial direction AD to bring friction material 226 into contact with surfaces 214 and 220 to non-rotatably connect shells 212 and 218. Thus, torque transmitted to shell 212 is directly transmitted to shell 218.

In order to bond the friction material to surface 214 or 220, surface 214 or 220 are roughened to facilitate the bonding of the adhesive to surface 214 or 220. Typically, blades 216 and 222 are fixed to shells 212 and 218, respectively, by a brazing process which involves heating the blades and shells. The heating causes some distortion of surfaces 214 and 220. Surfaces 214 and 220 are then machined to remove the distortion. Because of the machining step, the roughening cannot be conducted until after the brazing process. That is, the machining would obliterate the roughening if performed prior to the brazing operations.

The following describes a method fabricating torque converter 200. Although the method is presented as a sequence of steps for clarity, no order should be inferred from the sequence unless explicitly stated. A first step forms impeller shell 212 including annular portion 212A. A second step fixedly connects blades 216 to the impeller shell. A third step forms turbine shell 218 and annular portion 218A. Portion 218A includes surface 220. A fourth step fixedly connects blades 222 to turbine shell 218. A fifth step bombards surface 214 or 220 with particles of solidified carbon dioxide or with particles of $NaHCO_3$. A sixth step applies an adhesive to bombarded surface 214 or 220. A seventh step bonds, with the adhesive, friction material 226 to bombarded surface 214 or 220.

When surface 214 is bombarded with particles of $NaHCO_3$, an eighth step washes the impeller shell and blades 216 to remove particles of $NaHCO_3$ remaining in or on the impeller shell or blades 216 after the bombardment is completed. When surface 220 is bombarded with particles of $NaHCO_3$, an eighth step washes the turbine shell and blades 222 to remove particles of $NaHCO_3$ remaining in or on the turbine shell or blades 222 after the bombardment is completed.

In an example embodiment, fixedly connecting blades 216 to the impeller shell includes applying brazing material to the impeller shell and/or blades 216, and heating the impeller shell, brazing material, and blades 216. In an example embodiment, a ninth step, prior to the fifth step, machines surface 214. In an example embodiment, fixedly connecting blades 222 to the turbine shell includes applying brazing material to the turbine shell and/or blades 222, and heating the turbine shell, brazing material, and blades 222. In an example embodiment, a tenth step, prior to the fifth step, machines surface 220.

An eleventh step assembles the turbine and the impeller with stator 210. A twelfth step fixedly connects impeller shell 212 to cover 204.

Advantageously, any carbon dioxide particles remaining in impeller 206 or turbine 208 following the fifth step evaporate at ambient temperature. Therefore, no residue, which could adversely affect torque converter 200 or equipment associated with converter 200, is left behind.

Since $NaHCO_3$ is water-soluble, the washing process of the ninth and tenth steps advantageously is able to remove virtually all of the $NaHCO_3$ remaining in impeller 206 or turbine 208 following the fifth step. Therefore, no particulate, which could adversely affect torque converter 200 or equipment associated with converter 200, is left behind.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method of fabricating a torque converter, comprising:
   forming a turbine shell including a first annular portion, the first annular portion:
      including a first surface having a first roughness; and,
      forming a radially outermost portion of the turbine shell;
   fixedly connecting a first plurality of blades to the turbine shell;
   forming an impeller shell including a second annular portion having a second surface with a second roughness;
   fixedly connecting a second plurality of blades to the impeller shell;
   bombarding the first or second surface with particles of solidified carbon dioxide or with particles of $NaHCO_3$;
   applying an adhesive to the bombarded first or second surface; and,
   bonding friction material to the bombarded first or second surface with the adhesive.

2. The method of claim 1, further comprising:
   when the first surface is bombarded with $NaHCO_3$, washing the turbine shell and the first plurality of blades to remove particles of $NaHCO_3$ remaining in or on the turbine shell or the first plurality of blades; or,
   when the second surface is bombarded with $NaHCO_3$, washing the impeller shell and the second plurality of blades to remove particles of $NaHCO_3$ remaining in or on the impeller shell or the second plurality of blades.

3. The method of claim 1, wherein:
   fixedly connecting the first plurality of blades to the turbine shell includes:
      applying brazing material to the turbine shell or the first plurality of blades; and,
      heating the turbine shell, brazing material, and first plurality of blades.

4. The method of claim 3, further comprising, prior to removing the at least a portion of the first or second surface:
   machining the first surface to attain the first roughness.

5. The method of claim 1, wherein:
   fixedly connecting the second plurality of blades to the impeller shell includes:
      applying brazing material to the impeller shell or the second plurality of blades; and,
      heating the impeller shell, brazing material, and second plurality of blades.

6. The method of claim 5, further comprising, prior to removing the at least a portion of the first or second surface:
   machining the second surface to attain the second roughness.

7. The method of claim 1, further comprising:
   assembling the turbine and the impeller with a stator including a third plurality of blades.

8. The method of claim 7, further comprising:
   fixedly connecting the impeller shell to a cover for the torque converter.

\* \* \* \* \*

UNITED STATES PATENT AND TRADEMARK OFFICE
CERTIFICATE OF CORRECTION

| | |
|---|---|
| PATENT NO. | : 9,657,824 B2 |
| APPLICATION NO. | : 14/672965 |
| DATED | : May 23, 2017 |
| INVENTOR(S) | : Farahati et al. |

It is certified that error appears in the above-identified patent and that said Letters Patent is hereby corrected as shown below:

On the Title Page

Delete the title page and replace with the attached title page showing the corrected number of claims.

In the Claims

Claim 4 should be deleted.

Claim 6 should be deleted.

Claims 5 and 7 should be re-numbered as Claims 4 and 5, respectively.

Claim 8 should be re-numbered as Claim 6 and to depend on Claim 5.

Signed and Sealed this
Twenty-first Day of April, 2020

Andrei Iancu
*Director of the United States Patent and Trademark Office*

CERTIFICATE OF CORRECTION (continued)

(12) United States Patent
Farahati et al.

(10) Patent No.: US 9,657,824 B2
(45) Date of Patent: May 23, 2017

(54) METHOD OF FABRICATING A TORQUE CONVERTER WITH AN ETCHED CLUTCH SURFACE AND A TORQUE CONVERTER WITH AN ETCHED CLUTCH SURFACE

(71) Applicant: Schaeffler Technologies AG & Co. KG, Herzogenaurach (DE)

(72) Inventors: Rashid Farahati, Copley, OH (US); Jeffrey Krause, Doylestown, OH (US); Christine Malott, Ashland, OH (US); Prasanna Gurumurthy, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 33 days.

(21) Appl. No.: 14/672,965

(22) Filed: Mar. 30, 2015

(65) Prior Publication Data
US 2015/0276034 A1  Oct. 1, 2015

Related U.S. Application Data
(60) Provisional application No. 61/973,312, filed on Apr. 1, 2014.

(51) Int. Cl.
*F16D 37/00* (2006.01)
*F16H 45/02* (2006.01)
*F16H 41/28* (2006.01)

(52) U.S. Cl.
CPC ............ *F16H 45/02* (2013.01); *F16H 41/28* (2013.01); *F16H 2045/0278* (2013.01); *F16H 2045/0289* (2013.01); *F16H 2045/0294* (2013.01); *Y10T 29/49321* (2015.01)

(58) Field of Classification Search
CPC .. F16H 45/02; F16H 41/28; F16H 2045/0278; F16H 2045/0294; F16H 2045/0289
See application file for complete search history.

(56) References Cited

U.S. PATENT DOCUMENTS 5,480,007 A    1/1996  Hartford
6,296,445 B1 * 10/2001 Chasseguet ............ F16H 41/28
                                                416/180
6,315,639 B1  11/2001  Kipp
(Continued)

FOREIGN PATENT DOCUMENTS

WO    2013-060313    5/2013

*Primary Examiner* — David J Hlavka
(74) *Attorney, Agent, or Firm* — Chester Paul Maliszewski (57) ABSTRACT

A method of fabricating a torque converter, including: forming a turbine shell including a first annular portion with a first surface having a first roughness and forming a radially outermost portion of the turbine shell; fixing a first plurality of blades to the turbine shell; forming an impeller shell including a second annular portion with a second surface having a second roughness; fixing a second plurality of blades to the impeller shell; removing at least a portion the first or second surface without the use of particulate matter or a liquid; increasing the first or second roughness of the first or second surface from which the at least a portion is removed; applying an adhesive to the first or second surface from which the at least a portion is removed; and bonding, with the adhesive, friction material to the first or second surface.

6 Claims, 5 Drawing Sheets